Dec. 28, 1954  J. DURNAL ET AL  2,698,099
PORTABLE ROLLING MACHINE FOR FINISHING RECAPPED TIRES
Filed June 12, 1952

INVENTORS
JERRY DURNAL
JUSTUS H. DURNAL

BY

Knox & Knox

AGENTS FOR APPLICANTS

United States Patent Office 2,698,099
Patented Dec. 28, 1954

2,698,099
PORTABLE ROLLING MACHINE FOR FINISHING RECAPPED TIRES

Jerry Durnal and Justus H. Durnal, San Diego, Calif., assignors to Durnal & Sons, San Diego, Calif., a partnership Application June 12, 1952, Serial No. 293,224

2 Claims. (Cl. 214—1)

Our invention relates to a machine for rolling a tire during finishing operations on the tire, and it is a primary object of the invention to provide a lightweight portable tire rolling machine of this character which is ideal for the small shop as, for example, in finishing recapped tires.

A second object is to provide a tire rolling machine wherein a high rotational velocity can be obtained safely and quickly since the tire is scientifically stabilized by a novel and highly efficient arrangement of rollers disposed near the top of and laterally of the tire being operated upon.

An object ancillary to the immediately preceding object is to provide new driving means for the tire rotation. This feature results in more constant rotational speed and less wobbling of the tire than can be attained where double cone driving rollers are employed. In prior machines of this general type the drive rollers are formed with double frusto-conical portions and a rotating tire, when it wobbles even slightly, engages a larger diameter portion on one side thereof than on the other side thereof with consequent irregularity of driving action being imparted to the tire and an uneven rotational velocity as well as an increased tendency to wobble. In our machine the frusto-conical portions are idlers serving merely as guides during initial insertion and preliminary acceleration and subsequent deceleration and ejection of the tire.

Another object of the invention is to provide a machine of this character wherein the tire can be rolled into the machine from the floor without lifting the tire to any great height and the tire is also substantially self-ejecting when the operator arrests the rotation thereof, the ejection being at the lower end of the machine where the operator stands, thus facilitating this portion of the operation.

Still another object is to provide a generally simplified yet completely satisfactory frame design involving means for disassembly to facilitate crating, storage, and shipping of the machine, the superstructure of the machine involving little more than simple stanchions with a pair of easily detached stabilizing roller assemblies.

A last object to be mentioned specifically is to provide a tire rolling machine which is inexpensive and practicable to manufacture, simple, safe and easy to operate, as well as generally efficient and durable in use.

With these objects definitely in view, the invention comprises certain construction, arrangement and combination of elements and portions as will be hereinafter described in the specification, particularly pointed out in the claims and illustrated in the drawing, in which:

Figure 1:
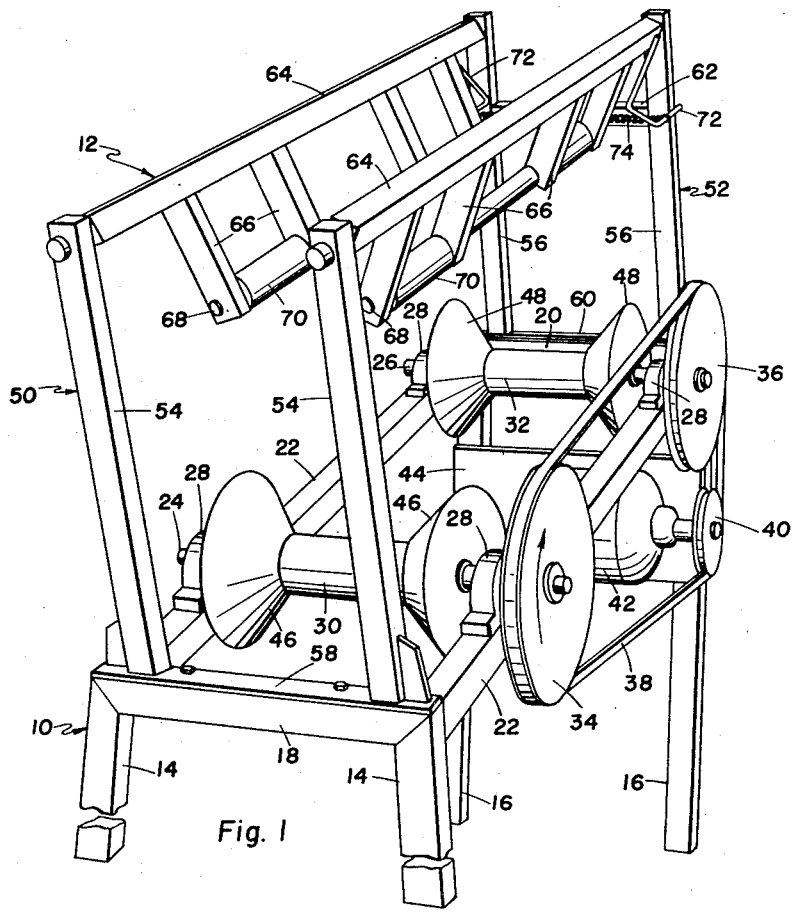
Figure 1 is a view, in perspective of the assembled machine.
Figure 2:
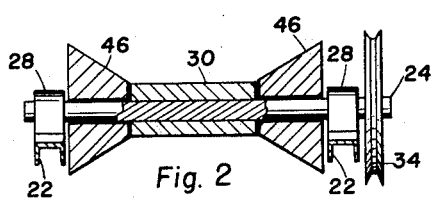
Figure 2 is vertical sectional view of one of the supporting roller assemblies, with a drive shaft, bearings and drive pulley therefor shown in elevation.
Figure 4:
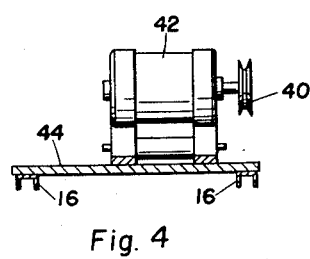
Figure 4 is a top plan view of the motor with rear legs, upon which the motor mounting plate is secured, shown in horizontal section.
Figure 3:
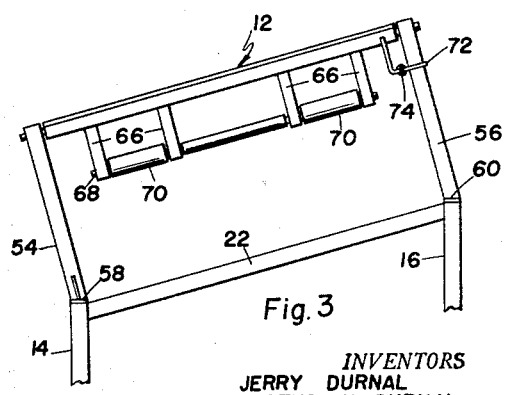
Figure 3 is a side elevational view of the stanchion and stabilizing roller assembly.

Referring now to the drawing in detail, the frame is comprised of a base generally indicated at 10 and a superstructure generally indicated at 12. The base consists of a pair of shorter front legs 14 and a pair of longer rear legs 16, illustrated as constructed from channel iron, and the units of each of said pairs are joined by horizontal cross pieces 18 and 20. The front and rear leg assemblies are joined by bearing supporting parallel bars 22 which are inclined upwardly at the rear of the machine.

Drive shafts 24 and 26 are journalled in bearings 28 supported on said bars 22 and on these shafts are rigidly connected the tire driving and supporting rollers 30 and 32. Drive pulleys 34 and 36 are fixed to corresponding ends of said drive shafts 24 and 26 and a belt 38 operatively connects both said drive pulleys with the pulley 40 of an electric motor 42 carried by a mounting plate 44 welded or otherwise secured to and between the rear legs 16. It will be noted that each tire driving and supporting roller assembly includes a pair of opposed frustoconical guide rollers 46 and 48 freely rotatively mounted on the drive shafts 24 and 26 at the ends of the cylindrical rollers 30 and 32.

The superstructure 12 comprises stanchions 50 and 52 and these stanchions have parallel horizontally spaced arms 54 and 56 inclined forwardly and upwardly, with integral base cross bars 58 and 60 bolted or otherwise connected to said cross pieces 18 and 20 for rigid mounting yet reasonably easy disassembly. A rear tie bar 62 lends additional support to the superstructure. Between corresponding arms 54 and 56, a pair of opposing stabilizing roller assemblies are mounted, each assembly comprising a beam 64 terminally rotatively mounted to and between the arms 54 and 56 for free rotative movement about axes parallel to said bars 22. The beams 64 have integral depending bearing arms 66 which carry journal shafts 68 with idler stabilizing rollers 70 mounted thereon between the bearing arms 66. Stops 72, fixed to said beams 64, engage the rear stanchion arms 56 when the rollers approach predetermined positions, while helical springs 74 are terminally secured to said stops 72 and to a pin disposed centrally of said tie bar 62 to bias said stabilizer roller assemblies to swing so that said rollers 70 approach each other.

The operation of this invention will be clearly understood from a consideration of the foregoing description of the mechanical details thereof, taken in conjunction with the drawing and the above recited objects. In recapitulation it can be added that the recapped tires, or other tires to be finished, are manually rolled into the machine between the stabilizing rollers 70 and also in engagement with the driving and supporting rollers 30 and 32. The guide rollers assist in orienting the tire with the rollers 30 and 32 driven at reasonably high speed, the tire is rotated, stabilized by the rollers 70, and the operator standing at the front of the machine is enabled to complete the desired trimming of protruberances from the side walls and tread of the tire or other operation, such as painting the tire, after which the tire is substantially automatically ejected forwardly out of the machine toward the operator by merely arresting the tire from its rotational movement.

Further description would appear unnecessary.

We claim:

1. A rolling machine for finishing recapped tires comprising an elongated rigid frame having one end higher than the other, a tire-supporting roller assembly mounted transversely of the frame adjacent each end thereof, power means operatively mounted on said frame to rotate said roller assemblies in the same direction, a rigid superstructure on said frame, a pair of spaced parallel beams extending longitudinally of the frame substantially vertically above the ends of said roller assemblies, said beams being mounted on said superstructure for oscillation about their longitudinal axes, bearing arms on said beams, opposing tire stabilizing rollers rotatably mounted on said bearing arms, the axes of said stabilizing rollers being inclined and parallel to said frame, and spring means to bias said opposing stabilizing rollers toward each other.

2. A machine according to claim 1 and wherein each of said roller assemblies is comprised of a central shaft, a central right-cylindrical portion, and a frusto-conical portion at each end of said right-cylindrical portion, said right-cylindrical portions being fixed on said shaft, and said frusto-conical portions being freely rotatably mounted on said shaft.

References Cited in the file of this patent
UNITED STATES PATENTS

| Number | Name | Date |
|---|---|---|
| 1,376,579 | Ramsdell | May 3, 1921 |
| 2,370,496 | Seip | Feb. 27, 1945 |
| 2,395,593 | Trager | Feb. 26, 1946 |